March 1, 1960

L. G. GHEEN 2,926,686

AUTOMATIC DRAIN VALVE

Filed May 7, 1956

INVENTOR.
LYNDLE G. GHEEN
BY
Buckhorn and Cheatham
ATTORNEYS

United States Patent Office 2,926,686
Patented Mar. 1, 1960

2,926,686

AUTOMATIC DRAIN VALVE

Lyndle G. Gheen, Eugene, Oreg., assignor to R. H. Pierce Manufacturing Co., Eugene, Oreg., a corporation of Oregon Application May 7, 1956, Serial No. 582,959

2 Claims. (Cl. 137—217)

The present invention comprises an automatic drain valve for association with a fluid conduit, the valve automatically closing when the pressure within the conduit exceeds a predetermined value such as the static pressure of the fluid contained within the conduit at the locality of the valve, and automatically opening when the pressure at such locality is equal to or less than such static pressure.

The principal object of the present invention is to provide a long lasting, easily replaceable and inexpensive valve for association with water conduits, particualrly thin-walled conduits used in field irrigation systems of a portable nature. Such field irrigation systems usually comprise a plurality of lengths of thin-walled aluminum or steel pipe, in the range of two to eight inches in diameter, quick couplers connecting the pipes together, and spraying means connected to the pipes through risers. The conduits may be laid upon the ground, in which case they are disassembled in order to be manually carried to new positions about a field to be irrigated, or they may be mounted upon wheels, dollies, sleds or equivalent means whereby they may be rolled or dragged about the field from position to position. In any event, it is extremely desirable that the conduit be rapidly drained of its water content as soon as the water pressure is turned off; otherwise the operator is delayed or seriously hampered in moving the conduit from position to position. The present invention comprises a valve, a plurality of which may be placed at spaced intervals along such a conduit, which will permit such rapid draining.

Another object of the present invention is to provide a valve of the foregoing character which will operate as a siphon-breaker to prevent the collapse of the thin-walled pipe in the event a long section of conduit is rapidly drained by opening a large valve at the bottom of a section containing a high head of water.

Details of the present invention will be readily understood by reference to the accompanying drawings, taken in connection with the following specifications, wherein like numerals refere to like parts throughout.

In the drawings,

Fig. 1 discloses an open valve formed in accordance with the present invention and mounted in a section of pipe which is partly broken away, the view being taken substantially along the line 1—1 of Fig. 2;

Figure 1:
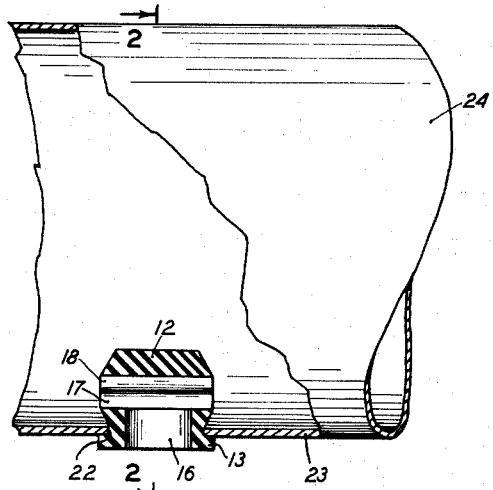
Figure 2:
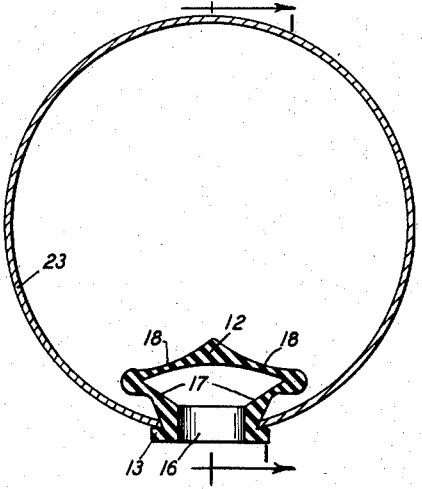
Fig. 2 is a transverse section through a pipe having an open valve mounted therein, the view being taken substantially along line 2—2 of Fig. 1.
Figure 3:
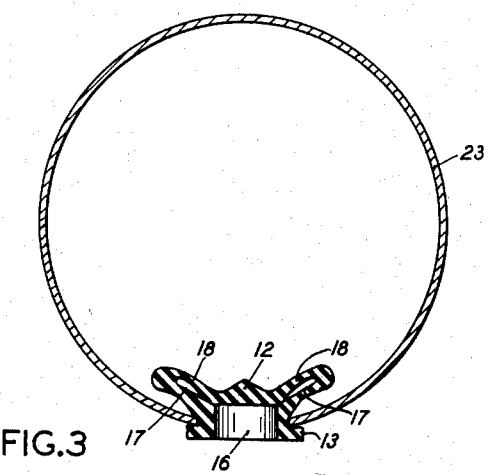
Fig. 3 is a view similar to Fig. 2 but showing the valve in closed position.
Figure 4:
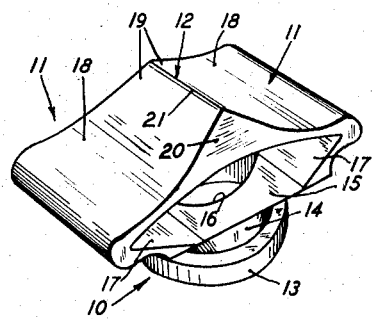
Fig. 4 is a perspective view, on an enlarged scale, showing the valve separated from the pipe.

Referring to Figs. 1 to 4 inclusive, it will be seen that this form of the valve comprises integrally connected portions of elastomeric material moulded in one piece. The essential portions of the valve are a grommet from which a pair of hinged arms 11 extend laterally and slightly upwardly in opposite direction, then back toward each other in spaced relation to the grommet, and a valve head portion 12 connecting the arms together above the opening through the grommet. The grommet comprises a heavy lower flange 13 from which an upwardly tapering neck portion 14 extends. The upper surface of the grommet provides a valve seat 15 which is substantially flat and of substantially the same width as the opening 16 through the grommet.

The arms 11 are as wide as the grommet and extend laterally in opposite directions to provide lower portions 17 which are relatively thin intermediate their ends. The arms then bend backwardly above the lower portions to provide upper portions 18 which are also relatively thin intermediate their ends. The integrally connected valve head portion 12 is shaped like a gable-ended roof, having laterally sloping sides 19 and longitudinally sloping ends 20, the sides coming together to define a ridge 21 extending transversely with respect to the direction of the arms above the center of the drain opening 16.

The valve as described is adapted to be inserted through a circular opening 22 in the lower surface of the wall 23 of a section of pipe 24, or in any other suitable position to permit draining of the liquid from the pipe. If the opening 22 is near an end of a pipe section the valve may be mounted by forcing the grommet flange 13 through the opening 22 from the inside of the pipe. However, the arms 11 may be folded back upon the roof portions 19 whereby the valve may be mounted in position by inserting it through the opening 22 from the outside of the pipe. As seen in the drawings the arms 11 preferably extend transversely with respect to the axis of the pipe; but the valve will operate regardless of the relative position of the valve arms with respect to the axis of the pipe. Less resistance to water flow is provided when the valve is mounted as illustrated. The thick valve head portion assures complete closing of the valve when the pressure builds up to required amount, the elastic valve and the elastic valve seat deforming to each other to provide a tight closure. The roof shape of the valve head portion provides sufficient rigidity and strength so that the valve head portion will not be forced outwardly through the valve opening 16 when the conduit is under pressure. The sloping sides and ends of the valve head portion present streamlined surfaces so as to reduce water friction to a minimum and prevent leaves and other trash from being caught on the valve.

The thin sections in the arm portions 17 and 18 permit the arms to flex at a plurality of points. Thus bending is slight at any point, contributing greatly to the life of the valve.

The diverging neck portion 14 assures a relatively tight fit of the grommet in the opening 22, regardless of minor variations in the size of the opening or of the grommet itself. Also, this maintains the valve seat surface 15 above the curvature of the pipe wall so that a tight closure is provided.

Figure 5:
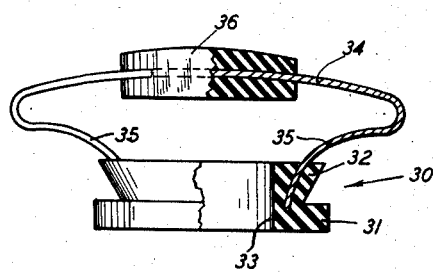
Fig. 5 is a view in side elevation, partially broken away, showing a modified form of the valve.

A modification of the present invention is disclosed in Fig. 5 wherein a separate elastomeric grommet 30 having a lower flange 31 and a tapering neck portion 32 as previously described provides a drain opening 33 through the grommet. A section of metallic leaf spring is provided in place of the integral arms of the preferred modification. The leaf spring comprises a central portion 34 overlying the grommet, from which inwardly extending arms 35 extend down to the grommet and have their terminals imbedded in the grommet. A thick disc-shaped valve head 36 of elastomeric material is moulded onto the central portion 34 of the spring whereby to provide a unitary construction which may be mounted as previously described, and which operates essentially as previously described. The metallic leaf spring is preferably formed of non-corrosive material such as phosphor-bronze.

In either form of the device the resistance to closure of the valve is provided by the reversely bent arms which support the valve head. The strength of the arms, or resistance to flexing thereof, may be varied as desired by changing the durometer of the elastomeric material, or by changing the thickness, width or length of the arms. Ordinarily the static head in an irrigation conduit will not exceed two or three feet of water when the pressure is turned off and the valve is designed to close when the pressure exceeds this amount of static head.

Even though a length of the conduit should be inverted across a ground dip or valley the valves will operate in succession as the water level lowers from valve opening to valve opening. Opening of the valves not only permits rapid draining so that the conduit may be moved, but prevents collapsing of the thin-walled conduit by venting the interior thereof to atmosphere.

Having illustrated and described preferred embodiments of the present invention it should be readily apparent to those skilled in the art that the same permits of modification in arrangement and detail. All such modifications as come within the scope of the appended claims are considered to be within the ambit of the invention.

I claim:

1. An automatic drain valve for mounting in a drain opening of a fluid conduit to provide means for automatically draining the conduit when the flow of fluid therein is terminated, the valve automatically closing when the pressure within the conduit at the locality of the drain valve exceeds a predetermined value and opening when the pressure within the conduit at the locality of the drain valve drops below such value, such valve comprising an integral construction of elastomeric material including a grommet for mounting in an opening, said grommet having a radially extending flange portion and a neck portion extending from said flange portion, said neck portion being tapered and progressively increasing in diameter and extending outwardly in a direction angularly away from said flange portion and providing at its remote end an outwardly directed valve seat surface, a pair of inherently resilient spring arms including first portions having inner ends integrally joined to said neck portion, said first portions each extending laterally outwardly in opposite directions from said neck portion and being inclined in a direction outwardly away from said neck portion, said arms also including second portions extending back inwardly of said valve in overlapping and normally spaced relation to said first portions, said second and first portions having outer ends integrally joined with each other, a valve head portion integrally joined to and supported by the inner ends of said second portions and biased in spaced relation to said valve seat surface by said spring arms, said valve head portion having a seating surface arranged for cooperation with said valve seat surface for closing said valve, said first portion and second portion of said arms each being progressively thicker from their inner ends to their outer ends.

2. An automatic drain valve as defined in claim 1 in which said spring arms and valve head portion are as wide as said grommet, and said valve head portion is shaped like a gable-end roof with its ridge extending transversely with respect to said arms and away from said valve seat surface.

References Cited in the file of this patent

UNITED STATES PATENTS

| | | |
|---|---|---|
| 205,566 | Miller | July 2, 1878 |
| 603,941 | Cartwright | May 10, 1898 |
| 1,969,118 | Brucker | Aug. 7, 1934 |
| 2,369,170 | Motsinger | Feb. 13, 1945 |
| 2,768,639 | Stilwell | Oct. 30, 1956 |
| 2,775,979 | Stout et al. | Jan. 1, 1957 |